May 12, 1953   R. FORTUNE   2,638,306
DIAPHRAGM VALVE

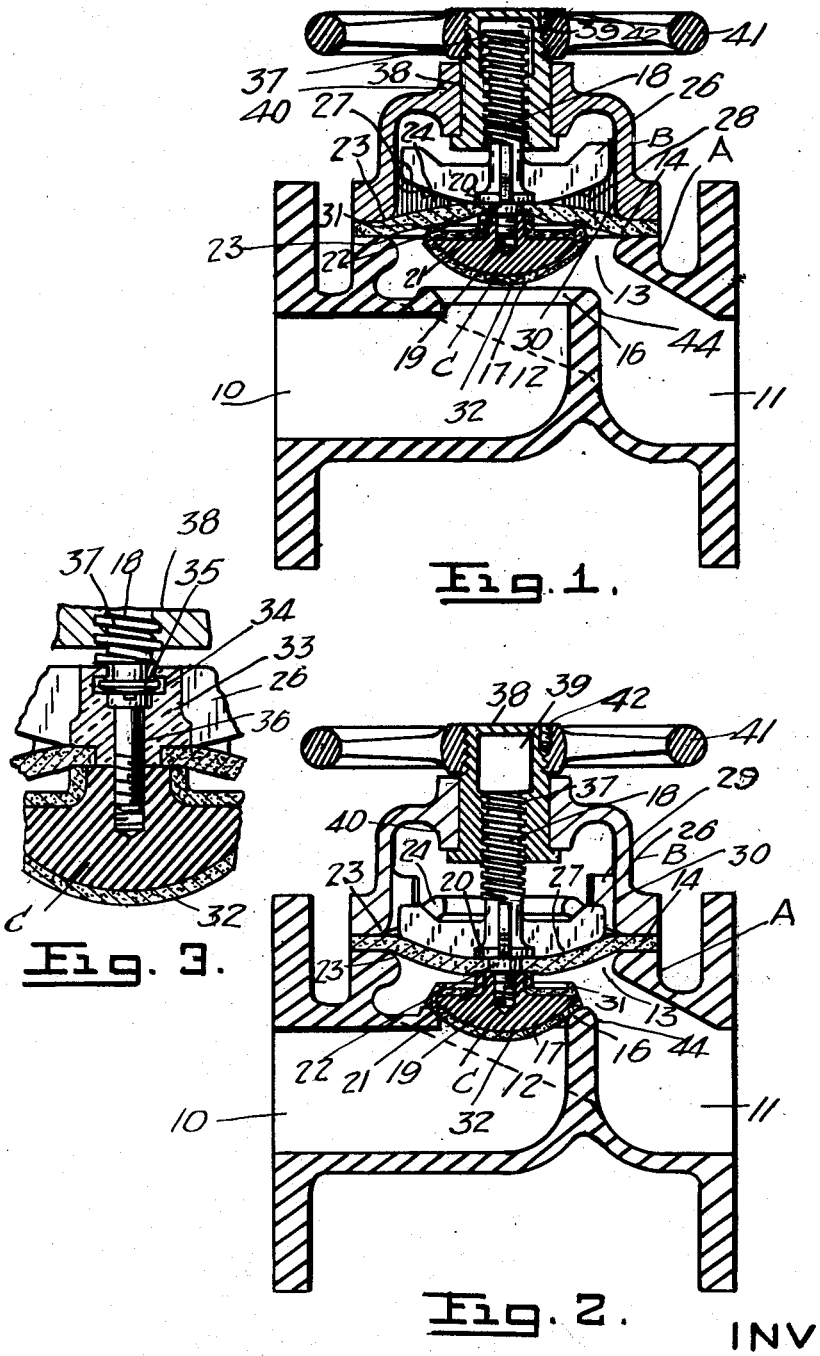

Original Filed Dec. 15, 1943   3 Sheets-Sheet 2

INVENTOR
R. FORTUNE
BY
ATTORNEYS

May 12, 1953

R. FORTUNE 2,638,306

DIAPHRAGM VALVE

Original Filed Dec. 15, 1943

INVENTOR
R. FORTUNE

BY

ATTORNEYS

Patented May 12, 1953

2,638,306

UNITED STATES PATENT OFFICE 2,638,306

DIAPHRAGM VALVE

Ronald Fortune, Hamilton, Ontario, Canada

Original application December 15, 1943, Serial No. 514,344. Divided and this application June 4, 1948, Serial No. 31,117

10 Claims. (Cl. 251—31)

This invention relates to diaphragm valves and particularly to a valve which employs a dual seating valve member interposed between the diaphragm and the fluid orifice controlled by the valve.

This application is a division of my abandoned application, Serial Number 514,344, filed December 14, 1943.

Diaphragm valves up to the present time have largely been of a type wherein the diaphragm has formed the valve member by means of which the fluid flow through the body is throttled or completely shut off. In this type of construction the diaphragm has necessarily been squeezed between the seat of the valve body and the valve operating spindle and associated mechanism. Pinching or squeezing of the diaphragm between two solid members rapidly deteriorates the rubber or other flexible material of the diaphragm and more especially when the valve is closed for long periods or when the diaphragm is repeatedly opened or closed in daily service.

Many acids, oils or solvents are inherently destructive to rubber, synthetic and other fabricated materials and the life of these materials is more rapidly shortened when the diaphragm is caused partially to wear or deteriorate by being squeezed or compressed between two solid metal members such that fluids of the character specified more easily attack it.

It has previously been proposed to employ a valve structure, incorporating a diaphragm merely as a sealing member, and to employ in conjunction with the diaphragm a valve member therebelow which will perform the actual fluid flow controlling function. This obviates some of the disadvantages of the more usual type of diaphragm valve since it avoids the squeezing of the diaphragm between two solid members but it has other disadvantages such as forming an impediment to the free flow of fluid through the valve since the valve member controlling the flow of fluid is disposed partially in the path of fluid flow. Moreover, such valve member may also operate to clog the system with which it is employed, particularly where the fluid is a conveying medium for solid or substantially solid particles which may tend to lodge between the diaphragm and the valve member such as when the valve member is opened between fully open and fully closed position.

Finally, both types of valve referred to may be subject to distortion and diaphragm flutter, i. e., they are subject to the action of vacuum which will cause the diaphragm to pulsate or may even draw parts of the diaphragm downwardly which is a further cause of errosive or abrasive deterioration of the diaphragm and also a restriction or impediment in the fluid flow through the valve.

The present invention obviates these disadvantages of the prior art and produces further advantages.

It is an object of the present invention to eliminate squeezing or compression of the diaphragm by providing a diaphragm valve wherein the diaphragm acts as a sealing member only and operates in conjunction with a valve member for controlling the flow of fluid through the valve.

A further object of the invention is to provide a valve of this character incorporating means for positively locking the diaphragm in the open position when the valve is opened, thus to eliminate flutter or distortion of the diaphragm due to vacuum and pulsating pressures.

A further object of the invention is to provide a valve of this character which may be readily opened and closed, regardless of the effects of pressure or vacuum which cannot be avoided where the diaphragm acts as the flow controlling member of the valve.

A still further object of the invention is to provide a valve of the character described wherein the valve member acts as a diffusing member for the impinging fluid and will not impede the flow of the latter.

A still further object of the invention is to provide a construction of this kind which will avoid clogging and particularly in the case where solid material may be suspended in the fluid.

Another object of the invention is to provide a valve of this general character wherein the valve spindle is completely enclosed avoiding dust proof packings and the like.

With these and other objects in view which will generally appear hereinafter the invention will be fully understood by reference to the following detailed specification taken in conjunction with the accompanying drawings.

In the drawings:

Fig. 1 is a longitudinal section taken through a valve of the present invention illustrating the valve in the open position.

Fig. 2 is a view corresponding to Fig. 1 but illustrating the valve in the closed position.

Fig. 3 is an enlarged detail sectional fragmentary view of an alternative manner to that shown in Figs. 1 and 2 of connecting the valve member to the valve operating spindle.

Figure 5:
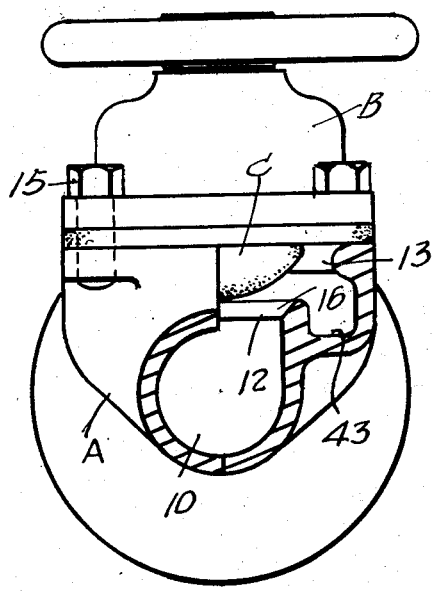
Fig. 5 is an end elevation of the valve partly in transverse section illustrating the peripheral spillway surrounding the fluid passage in the valve.

Referring to the drawings, A indicates a valve casing having an inlet passage 10, an outlet passage 11 and an intermediate communicating passageway 12. The valve casing has an opening 13 above the passageway 12 which is enclosed by the valve bonnet B.

According to the present invention the opening 13 is sealed by a diaphragm 14 which is clamped between the adjacent surfaces of the valve casing A and the bonnet B and secured such as by the cap screws 15 (see Fig. 5). This diaphragm, however, only acts as a sealing medium between the bonnet and the casing or body while the fluid control is effected by means of a valve member C which is positioned inwardly of the diaphragm and disposed concentrically with the passage 12 and designed to be moved towards or away from the valve seat 16 which defines the passageway 12. The valve member C has a graded working surface such as the semispherical surface 17, which is designed to seat on the valve seat 16. The valve member C is carried on a valve spindle 18 and connected therewith through the diaphragm preferably by means of a screw threaded member 19, which passes through the center of the diaphragm and connects with the valve member C as shown. In this connection it should be noted that the valve spindle 18 at its lower end is formed with a shoulder 20 whereas the hub 21 of the valve member C likewise forms a corresponding shoulder and between these shoulders the surrounding portion of the diaphragm 14 is secured. However, by reason of a spacing portion 22 of the spigot the connection obviates actual pinching or undue compression of the diaphragm.

Moreover, it will be noted from Figs. 1 and 2 the inner portions of the valve casing A and valve bonnet B are bevelled, rounded or otherwise graded as at 23, at the point where these parts engage the periphery of the diaphragm so that the latter is not subjected to biting edges at a main point of flexure. In these general features of mounting and support therefor the diaphragm 14 is protected.

Figure 4:
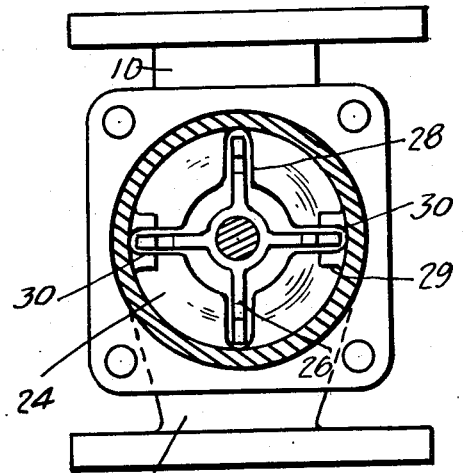
Fig. 4 is a transverse section taken through the bonnet of the valve to illustrate interior parts thereof in plan view.

The valve member C as is obvious is designed to be operated from the open position shown in Fig. 1 to the closed position shown in Fig. 2 and to intermediate positions to control the flow from the inlet 10 to the outlet 11. In operating between these two positions the diaphragm 14 is flexed either to the maximum degree in each direction as shown in Figs. 1 and 2 or to lesser degree when the valve member C is positioned in intermediate positions. In order to support the diaphragm in the open position the interior of the bonnet is provided with a shaped flange 24 of generally annular formation as shown particularly in Fig. 4. The lower surface of this flange is concaved as shown to support the outer side of the diaphragm 14 from pressure within the valve, when the valve member C is in the open position, whereas by means of a follower member in the form of a plurality of uniform, radial and preferably equi-angular fingers 26 either mounted on or forming an integral part of the valve spindle 18, the outer surface of the diaphragm is supported when in its lower position (as shown in Fig. 2) or intermediate positions. In this respect the fingers 26 are formed with a lower curved surface 27 which is designed to bear against the outer surface of the diaphragm and provide for equally distributed radially disposed support for the diaphragm against pressure thereon from within the valve. Thus, the diaphragm is supported, in the several open positions of the valve, against distortion due to pressure which may be imposed on the inner surface thereof. It is of course entirely relieved of such pressure when the valve member C is completely closed.

The radially disposed fingers 26 are concentrically arranged within the bonnet B while supporting flange 24 is slotted as at 28 to provide for the passage of the fingers when they traverse the general plane of the flange during movement of the valve member C towards or away from its seat 16. Moreover, in order to obviate any possible lateral displacement of the fingers 26 or possible rotation of the spindle 18 the interior circular wall of the bonnet is provided with the inwardly projecting spaced apart parallel ribs 29 forming therebetween the guideways 30 which thus guide the fingers during their vertical movement. This provides a simplified construction wherein the concentrically located uniform fingers 26 are housed completely within a simple, uniform and symmetrical bonnet, facilitating the assembly of the fingers, either opposed pair of which may be disposed in the guideway 30. Moreover, it produces a bonnet construction which may be readily cast and is advantageous both from the standpoint of outward appearance and manufacturing economy.

In order to avoid collapse or distortion of the diaphragm, due to vacuum created within the valve or from breathing, throbbing or fluttering when subjected to pulsating or sub-atmospheric pressure, the valve member C on its upper side is provided with upwardly projecting means preferably in the form of an upwardly projecting peripheral rim 31 which as shown in Fig. 1 is designed to engage the inner surface of the diaphragm and thus hold it firmly against its supporting flange 24 and in effect lock the diaphragm against movement. In this connection it should be noted that the diaphragm, when in the fully open position of the valve, and locked as described, is rigidly supported substantially midway between the center of the diaphragm and its outer clamped edges. Moreover, by reason of the fact that the rim 31 is spaced only slightly from the diaphragm when the latter is in its lowermost position during the seating of the valve member C (Fig. 2) it is obvious that when the valve member C is opened between the extreme positions the projecting rim will similarly engage the diaphragm, thus to obviate this distortion or collapse. Consequently, this frequent cause of wear of the diaphragm in a diaphragm valve is obviated.

The valve member C is preferably provided with a cover 32 which may be of rubber, or other suitable material as may be required and the upwardly projecting means for engaging the diaphragm such as the rim 31 preferably forms a part of this covering. However, it may be formed without a covering and the projecting means 31 can be otherwise formed.

The valve member C, however, is preferably of semi-spherical shape preferably covered to provide a resilient spherical contact with an irregular or non-precision seat as would be the case were the inside of the valve body to be unevenly coated such as with vitreous enamel or any other form of acid resisting substance. Furthermore, it can employ an impervious and corrosion proof covering so that all metal parts can be sealed against contact with corrosive or abrasive fluids which may pass through the valve.

The valve member C can be connected to the spindle construction as shown in Figs. 1 and 2 which provides a simple construction particularly adaptable for small valves and one which provides for a unit part integration of the spindle 18 supporting fingers 26 and screw threaded centering member 19. However, a flexible connection between the spindle 18 and the fingers 26 and valve member C may be provided. Such a construction is illustrated in Fig. 3 wherein the fingers 26 are formed as a unitary part in themselves and the hub 33 thereof is slotted as at 34 to receive the collar key 35 formed on the end of the spindle 18. The collar key 35 is preferably formed with a lower partly spherical surface and which can be slipped freely into the hub slot 34 to form a flexible coupling as well as a safety device for retaining screw 36 in position. The latter passes through the center of the hub 33 and forms the means of securing the valve member C in its proper position. When assembled this modified construction provides a radially pivoted floating ball contact between the lower spherical surface of the valve member C and the seat 16 of the valve permitting the ball like surface of the valve member C to make an adjustably leak proof fit with the seat.

This modified form of construction is advantageously employable in large valves as it prevents injurious torsional stresses from being transmitted to the flexible diaphragm as would be caused by rotatably assembling the hub 21 (Figs. 1 and 2) and its covering under combined torsional friction and compressing when fitting these components into sealing contact with the inner face of the diaphragm 14 at a location where the central perforation of the diaphragm surrounds the threaded member.

The valve member C is vertically operated by the valve spindle 18 preferably by screw threading the upper end of the spindle as at 37, the screw threading being designed to mesh with the internally threaded rotatable member 38 which in the preferred form of construction takes the form of a thimble or socketed member having enclosed socket 39. The member 38 is rotatably mounted in the shroud 40 of the bonnet B and designed to be rotated by the hand wheel 41 which is rigidly secured to the member 38 in any suitable manner here shown by means of the grub screw 42. Therefore, upon rotation of the hand wheel with consequent rotation of the member 38 the spindle 18 is caused to raise or lower vertically. In the upper position illustrated in Fig. 1 the upper end of the spindle is housed within the socket 39 whereas the depth of the socket as shown in Fig. 2 permits the required vertical movement. By this construction, therefore, the spindle is completely enclosed in a simple manner eliminating the necessity of dust seals packing and the like, the latter being unnecessary by reason of the sealing diaphragm 14.

Figure 6:
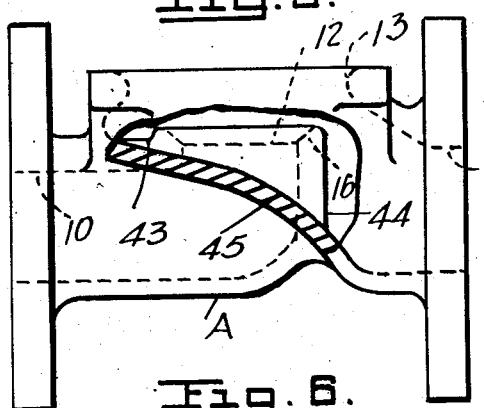
Fig. 6 is a side elevation partly in section to show the sloping character of the spillway to provide for a full volume, free flow of fluid through the valve body.
Figure 7:
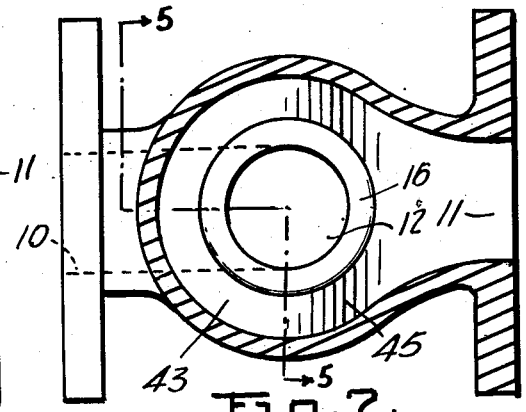
Fig. 7 is a transverse section taken through the valve body just above the valve seat to illustrate in plan the general character of the spillway, and converging outlet.

In addition to the advantages derived by the construction above described the internal structure of the valve casing is formed in such a way as to combine with the valve member C and the sealing diaphragm to provide for a structure which will permit of a free smooth flow of the material passing through the valve. In this connection the valve casing is so formed as to provide a spillway 43 (see Figs. 5–7 particularly) and which in effect forms a nozzle 44 surrounding the passage 12 through which the fluid is projected against the concentrically located, shaped valve member C which thus acts as a diffusing member to diffuse the flow of liquid from the passage 12 into the spillway 43 surrounding the nozzle 44. The spillway is radially extended to a substantial degree beyond the diameter of the passage to provide for a full volume flow and is gradually downwardly sloped on each side of the nozzle 44 as indicated at 45 (Fig. 6) to smoothly direct the flow of material to the full area outlet 11 and thus the valve provides for a continuous smooth full volume flow and is self draining. Moreover, by reason of the fact that the valve member C is formed with upwardly projecting means (the rim 31) to contact the under surface of diaphragm 14 when the valve member C is between its extreme positions, it will be obvious that in the case of fluid carrying dense solids in suspension, such solids are prevented from lodging between the valve member C and the diaphragm which otherwise might build up in effect to clog the valve or otherwise might tend to restrict the opening of the valve to the desired degree and with consequent acceleration of wear on the diaphragm 14, as well as restriction of flow.

Figure 8:
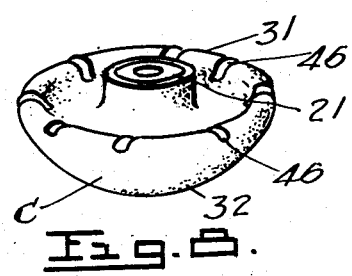
Fig. 8 is a perspective view of a modification of the valve member to illustrate draining passages.

In order to eliminate the lodging of impurities or the retention of acid or corrosive liquid between the valve member C and the diaphragm as in the case where the valve member is only slightly opened and before actual contact takes place between the rim 31 and the diaphragm 14, the valve member C may take the modified form shown in Fig. 8 wherein the rim 31 is provided with a plurality of radially directed notches or slots 46 which will thus permit the drainage of any fluid lodging in this area.

When the valve member C is only slightly open for substantially long periods there can be a tendency for such denser solids or sticky ingredients to adsorb to the upper surface of the valve member or to build up between this surface and the inner surface of the diaphragm 14. This disadvantage is obviated largely by the convexed upper surface of the valve member which serves, with the assistance of the velocity of the fluid, to shed the solids into the flow. However, if such solids or sticky ingredients should adhere or build up on this upper surface they are accommodated by the valve without affecting or substantially affecting its operation. In this connection, the valve member, preferably provided with resilient covering and preferably providing for pneumatic action will, in effect, accommodate such material in combination with the diaphragm. For instance, in the preferred form of construction the valve member C takes the form of a hollow member having the internal chamber 48 with which communicate a plurality of openings 49 disposed in the top of the valve member and located radially of its center. These openings preferably occur in conjunction with an annular groove or channel 50 and thus the openings are formed through a thinner web of material 51 in the top of the valve member between the peripheral upwardly projecting rim 52 and upwardly projecting central hub portion 53. Consequently as a result of this construction, if solid or sticky particles lodge between the upper surface of the valve member C and diaphragm 14 the substantial and yieldable cushion provided by the valve covering as it extends over the channel 50 and orifices or openings 49, will yield to trap or accommodate such particles. Moreover, as the valve is again returned to closed or partly open position the flexing of the covering of the valve to normal position will tend to project such particles from the surface of the valve and they will, with the assistance of the velocity of the fluid, be carried away in the flow. Likewise, if the particles tend to build up they will be broken down by this action.

Figure 10:
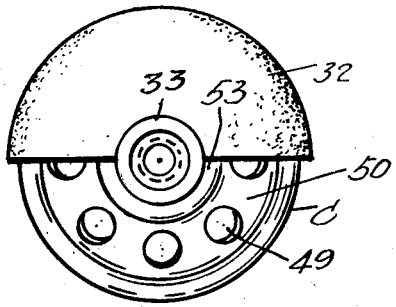
Fig. 10 is a top plan view of the valve member of Fig. 9 with the covering partially cut away, and, Fig. 11 is a section taken through an alternative form of valve member.
Figure 9:
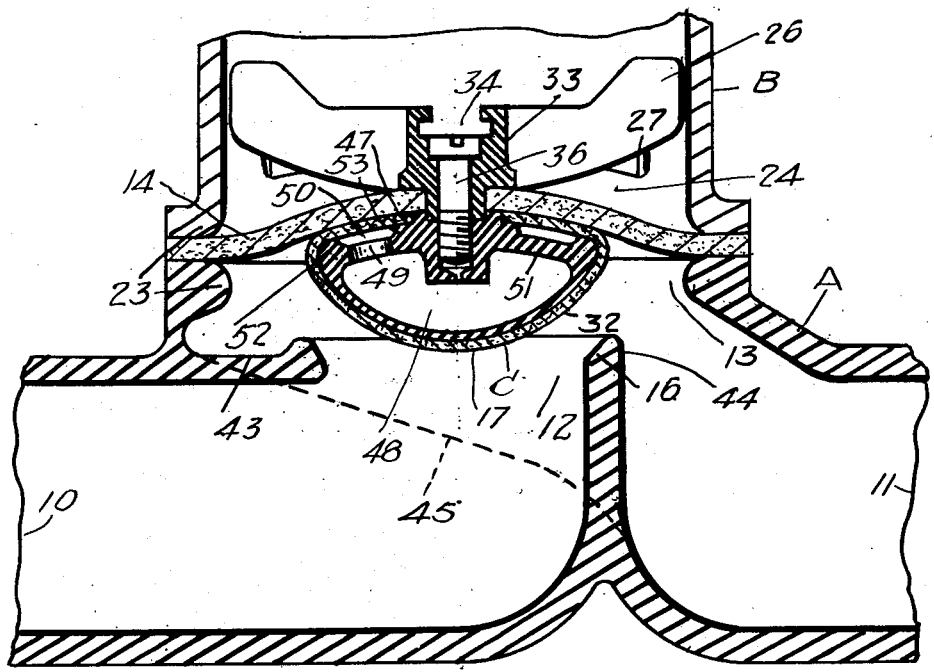
Fig. 9 is a longitudinal section taken through a valve of the present invention illustrating a modified form of valve member.

In Figs. 9 and 10 an altenative form of valve construction is illustrated. This follows the same principles as those of the previous forms of construction and incorporates the same advantages but provides in addition other advantages. This construction of valve member may be advantageously employed where the valve is used for fluids carrying dense or sticky solids in suspension. In this alternative construction the valve member C is altered in shape so far as its upper portion is concerned and preferably in general construction. The upper portion of the valve member is preferably arcuate or substantially convex rising to its highest level towards the center of the valve as indicated at 47. It is thus formed with upwardly projecting means to engage the diaphragm 14 similarly "to lock" the diaphragm against distortion, collapse, etc. in the open position of the valve.

The chamber 48 constitutes a pneumatic chamber which may be precharged, preferably with air, to any suitable pressure to assure pneumaic action after the resilient covering has been fastened to the surface of the valve member by high tensile adhesion. This will assure a positive expelling action in respect to any particles that may lodge on the upper surface of the valve member.

Figure 11:
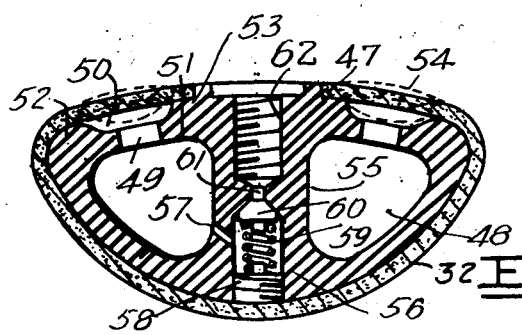

In Fig. 11 a valve member is shown incorporating an air inlet and sealing valve. In this construction the chamber 48 is of annular form surrounding the central hub 55 which extends axially through the valve member. In the lower portion of the hub the valve bore 56 is provided communicating by a suitable port or ports 57 with the chamber 48. The valve bore 56 is closed at one end by a screw threaded plug 58 which by means of a suitable spring 59 is designed to urge the air valve 60 against its seat to control the air inlet port 61, which communicates with the screw threaded bore 62 for receiving the mounting screw 36. In this way, therefore, the valve may be charged with air to provide for desired internal pressure which may accentuate the flexing action of the covering at 54 in order positively to project particles from the upper surface of the valve member which may have lodged there before or during movement of the valve from partially open to full open position.

As a result of this pneumatic construction of valve member C any part of solids which may be trapped between the valve member and the diaphragm will not restrict the full opening of the valve as said trapped ingredients become pocketed in the flexed portion 54 of the resilient covering subtending the annular pneumatic channel 50 and remain therein without affecting the desired operation and are automatically released immediately the valve member C and inner surface of the diaphragm are parted, due to the reflexing or opposite flexing movement of the covering and pneumatic compensation from within the sealed air chamber of the valve member.

From the foregoing it will be apparent that the present invention produces a number of advantages. Salient among these are a shaped valve member capable of effecting a dual seating as between the valve seat and the diaphragm which will permit proper seating under conventional conditions when the valve is closed and which will lock the diaphragm against collapse, distortion, etc., when the valve is open; a construction which through combination and arrangement eliminates the necessity of packings, etc.; the provision of a combination employing the valve member as a diffuser with a co-operating spillway for a smooth, even full volume flow, a construction which is self draining; and one which will act to obviate restriction of flow or operation due to the presence of solid particles suspended in the liquid controlled by the valve.

It is obvious, of course, that modifications might be made in the various types of connection and support, etc., so that it will be understood that the disclosure herein made is designed to illustrate the general principles of the invention.

What I claim as my invention is:
1. A valve, comprising, a body portion and a bonnet having corresponding openings, a fluid-impermeable flexible diaphragm clamped between said body portion and said bonnet across said openings whereby to seal said bonnet from said body portion, an inlet and an outlet in said body portion, a circular passageway in said body portion connecting said inlet and said outlet, a stem mounted in said bonnet along the axis of said diaphragm adapted to be moved toward and away from said passageway, a follower member connected to said stem, a valve member fastened to said stem below said diaphragm, adapted to cooperate with said passageway to open and close it, means for clamping said follower member, diaphragm and valve member at their centers, means in said bonnet against which the free flexing area of the diaphragm abuts when the valve is in fully opened position, said follower member having a convex surface adjacent the outer surface of the diaphragm and being normally spaced from said diaphragm surface except at the central clamped portion, said valve member having an upper portion smaller in circumference than said openings in order to enable said upper portion to pass through said openings, the face of said valve member adjacent said diaphragm being spaced therefrom, except immediately surrounding the clamped center, when the valve is in closed position, and being provided with means to lock said dia- phragm in the region of its free flexing area against said means in said bonnet against which the free flexing area of the diaphragm abuts when the valve is in fully opened position.

2. A valve assembly in accordance with claim 1 in which the means for clamping the follower member, diaphragm and valve member at their centers comprises a screw, the head of which fits loosely within a recess in the center of said follower member and abuts against a counterbored shoulder in said recess, the stem of said screw passing through a central hole in said follower member and diaphragm and being threaded into a tapped hole in said valve member.

3. A valve in accordance with claim 1 in which the means with which said valve member is provided to lock the diaphragm in the region of its free flexing area comprises an upwardly projecting peripheral rim on the surface of said member adjacent the diaphragm.

4. A valve in accordance with claim 3 in which the peripheral rim is provided with a plurality of radially directed notches to permit drainage of fluid from the upper surface of the valve member.

5. In a diaphragm valve employing a diaphragm as a sealing member and a valve member operable therewith to control the flow of fluid through the valve, said valve member comprising a body having a semi-spherical seat engaging surface, located inwardly of the diaphragm and a substantially convex upper surface, said convex upper surface forming means engageable with the diaphragm when said valve member is unseated for supporting said diaphragm against inward flexing movement, said valve member being hollow and covered with a resilient covering, said valve member being formed with orifices in its upper surface to provide substantial inwardly flexible areas of the covering, the latter accommodating solid or semi-solid particles tending to lodge between the valve member and the diaphragm, said areas reflexing, when said valve member is moved in a direction away from the diaphragm, to urge such particles from the upper surface of the valve member.

6. In a diaphragm valve employing a diaphragm as a sealing member and a valve member operable therewith to control the flow of fluid through the valve, said valve member comprising a body having a semi-spherical seat engaging surface, located inwardly of the diaphragm and a substantially convex upper surface, said convex upper surface forming means engageable with the diaphragm when said valve member is unseated for supporting said diaphragm against inward flexing movement, said valve member being hollow and covered with a resilient covering, said valve member being provided with an annular channel in its upper surface and being orificed in the area of the channel to communicate with the interior of the valve member thereby to provide substantial inwardly flexible areas of the covering, the latter accommodating solid or semi-solid particles tending to lodge between the valve member and the diaphragm, said areas reflexing, when said valve member is moved in a direction away from the diaphragm, to urge such particles from the upper surface of the valve member.

7. In a valve assembly comprising a body portion and a bonnet having corresponding openings, a fluid-impermeable flexible diaphragm clamped between said body portion and said bonnet across said openings whereby to seal said bonnet from said body portion, an inlet and an outlet in said body portion, a passageway in said body portion connecting said inlet and said outlet, a stem mounted in said bonnet along the axis of said diaphragm adapted to be moved toward and away from said passageway, and a follower member connected to said stem, the improvement comprising a valve member fastened to said stem below said diaphragm, adapted to cooperate with said passageway to open and close it, said valve member having a rigid core completely enveloped by a resilient material, more resistant to corrosion than said core, except at the center of the surface of said member adjacent to the diaphragm, and means for locking said follower member, diaphragm and valve member together only at their centers, said diaphragm cooperating with the surface of the valve member adjacent to the diaphragm when the valve is assembled to completely seal the rigid core from contact with corrosive fluids when the valve is in use.

8. The improvement in accordance with claim 7 in which the valve member is enveloped by rubber.

9. The improvement in accordance with claim 7 in which the valve member is semispherical in shape and enveloped by a resilient material.

10. The improvement in accordance with claim 7 in which the material enveloping the rigid core is resilient, the rigid core is substantially semispherical in shape and the surface thereof adjacent said diaphragm is provided with an annular channel forming an annular cavity between said enveloping material and the surface of said core.

RONALD FORTUNE.

References Cited in the file of this patent

UNITED STATES PATENTS

| Number | Name | Date |
|---|---|---|
| 1,647,823 | Antisell | Nov. 1, 1927 |
| 2,145,566 | Corydon | Jan. 31, 1939 |

FOREIGN PATENTS

| Number | Country | Date |
|---|---|---|
| 3,642 | Switzerland | of 1891 |
| 217,029 | Switzerland | of 1941 |
| 264,406 | Great Britain | of 1927 |